United States Patent [19]

Allen

[11] Patent Number: 5,715,213

[45] Date of Patent: *Feb. 3, 1998

[54] HIGH FIDELITY VIBRATORY SOURCE SEISMIC METHOD USING A PLURALITY OF VIBRATOR SOURCES

[75] Inventor: Kenneth Paul Allen, Dallas, Tex.

[73] Assignee: Mobil Oil Corporation, Fairfax, Va.

[ * ] Notice: The term of this patent shall not extend beyond the expiration date of Pat. No. 5,550,786.

[21] Appl. No.: 555,654

[22] Filed: Nov. 13, 1995

[51] Int. Cl.$^6$ ............................... G01V 1/24; G01V 1/36
[52] U.S. Cl. ............................... 367/48; 367/46; 181/111; 364/421
[58] Field of Search .......................... 364/421; 181/111; 367/46, 48, 49, 189

[56] References Cited

U.S. PATENT DOCUMENTS

| | | | |
|---|---|---|---|
| 4,184,144 | 1/1980 | Rickenbacker | 367/137 |
| 4,348,749 | 9/1982 | Galbraith, Jr. | 367/46 |
| 4,545,039 | 10/1985 | Savit | 367/39 |
| 4,646,274 | 2/1987 | Martinez | 367/46 |
| 4,675,851 | 6/1987 | Savit et al. | 367/41 |
| 4,707,812 | 11/1987 | Martinez | 367/46 |
| 4,715,020 | 12/1987 | Landrum, Jr. | 367/38 |
| 4,755,976 | 7/1988 | Edelmann | 367/189 |
| 4,982,374 | 1/1991 | Edington et al. | 367/48 |
| 5,173,879 | 12/1992 | Cung et al. | 367/46 |
| 5,400,299 | 3/1995 | Trantham | 367/38 |
| 5,550,786 | 8/1996 | Allen | 367/48 |

OTHER PUBLICATIONS

Newman, "Inverse Acquisition Operator: In the Quest of Pure Source Signature," 58th Ann. Soc. Explor Geophys Int mtg, (Anaheim, Calif) Oct. '88.

*Primary Examiner*—Ian J. Lobo
*Attorney, Agent, or Firm*—Malcolm D. Keen

[57] ABSTRACT

A method for recording and pre-processing high fidelity vibratory seismic data includes the steps of measuring the motion of the vibrator which is related to the vibrator applied force times a transfer function of minimum phase, causal, linear system relating the actual vibrator output with the measured vibrator motion, separation of signals according to generating source, determining a ratio by dividing the vibratory seismic data by the measured motion of the vibrator to remove the unknown applied force leaving the earth reflectivity times a time derivative divided by a minimum phase function, minimum phase band pass filtering the resulting ratio and performing minimum phase deconvolution to remove the time derivative divided by the transfer function of minimum phase. The method may also include shot ensemble deconvolution, receiver ensemble deconvolution, statics correction, F-K filtering for noise, zero phase spiking deconvolution and model dephasing. A signal directly proportional to the actual signal that the vibrator is sending into the ground is used in pre-processing. The vibrator motion is measured to provide a signal that is used to process the data. The data is divided by the relative of the actual transmitted signal in frequency domain.

17 Claims, 3 Drawing Sheets

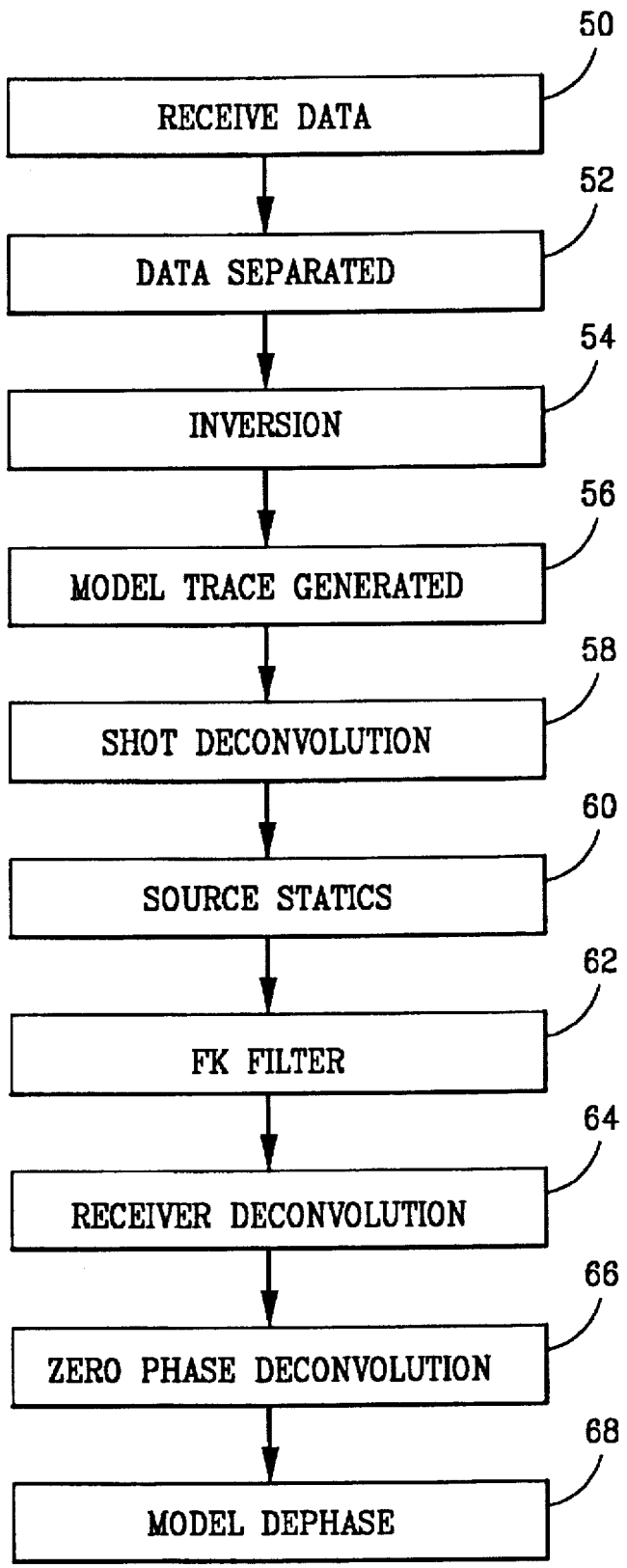

HIGH FIDELITY VIBRATORY SOURCE SEISMIC METHOD USING A PLURALITY OF VIBRATOR SOURCES

BACKGROUND OF THE INVENTION.

1. Field of the Invention

The present invention pertains to seismic data processing and more particularly to pre-processing seismic data in which data generated by multiple vibrating sources is received and prepared for high resolution or high fidelity data processing.

2. Related Prior Art

It is conventional practice to use vibratory sources to apply a force to the ground and measure the subsequent motion caused by the application of this force at various receiver locations. By controlling the duration and frequency of the force, a broad band signal with sufficient energy is achieved. By using the receiver motions and assumed force application a seismogram is constructed, usually by correlation with an estimate of the applied force, from which properties of the impedance function of the earth can be determined.

In the interest of economy, several sources are used at the same time. In order to construct a more accurate seismogram, a determination of which source was responsible for the motions detected by the receivers can be made. Each source has unique characteristics that aids in isolating the source that generated the force which caused the receiver motions, since the data received will vary for each source.. Processing with the estimate of one source on data generated by another source will produce an inaccurate seismogram. In order to increase the accuracy in producing a seismogram, the data must be separated according to its generating source for further processing with the force from its corresponding source.

The main deficiency of conventional practice is that an estimate of the actual applied force is used to create the seismogram. Much work has been done on order to improve the quality of feedback signals and the operation of feedback loops and hydraulic valves, however, harmonics, device flexure and variable ground coupling cannot be determined reliably and remain as unknowns affecting the accuracy of the estimate.

In gathering seismic data using ground vibrations, a large mass is placed in contact with the ground. Typically a force is applied by reversing hydraulic flow in a chamber in a reaction mass that is suspended by a piston and rod assembly that is attached to a stilt structure at a cross member. Typically, the reaction mass motion is measured by an accelerometer mounted on the reaction mass itself. The motion of a baseplate, which is actually coupled to the ground, is measured by an accelerometer mounted on the stilt structure cross member.

In conventional processing, data that is generated by a vibratory source is correlated with a reference sweep. A reference sweep signal is an ideal signal which the vibrator is told to put into the ground, which is often quite different from the actual signal which is generated. An estimate for the applied force is the mass weighted sum of the acceleration of the baseplate used in the vibrating source and the acceleration Of the reaction mass used in the vibrator structure, called the ground force.

The mass weighted sum of the two signals, one from the baseplate and one from its reaction mass, is used in a feedback loop to tell the actuator how close it is to the reference sweep. With this system it is assumed that the force injected into the ground is the same as the reference sweep. However, as stated previously, the actual signal is often very different from the reference sweep signal.

The force put into the ground can be viewed either in the time domain or in the frequency domain. Similarly, the impulse response of the earth can be viewed either in the time domain or the frequency domain. The time derivative of the force put into the ground is convolved with the impulse response of the earth in the time domain while the time derivative of the force is multiplied by the impulse response of the earth in the frequency domain. In its most basic form, a signal representing the derivative of the ground force convolved with the impulse response of the earth is detected by geophones or receivers located on the surface of the earth. This signal is detected after it has been reflected by an interface existing between two subsurface layers having different impedances. The detected signal is correlated with the reference sweep signal fed to the actuator. This correlation works fine to compress the force portion of the detected signal in a known way as long as the force put into the ground is the same as the reference sweep signal. Since it is rarely the same, an accurate estimate of the impulse response of the earth is seldom achieved.

Correlation in the frequency domain requires that the data be multiplied by the time reverse of whatever signal with which the correlation is being done. Since the reference signal is only an estimate of the actual ground force, the result is that unknowns remain in the data. In the case of correlation of the signal with the reference, the unknown does less damage to the result as long as the amplitude and phase errors of the reference signal are small, but it still adds error.

SUMMARY OF THE INVENTION

The present invention provides a method for recording and pre-processing high resolution vibratory source data which includes measuring the motion or motions of the vibrators. In the present invention, pairs of accelerometers are used in each of two positions on a large mass so that the outputs may be compared and a determination may be made whether the signal generated is suitable for use in further processing. The measured motion or motions of the vibrators are related to the actual vibrator applied force by a transfer function of a minimum phase, causal, linear system. These measured motions are used to separate received signals. Further, these signals are used in an inversion operation to process the received data.

The method of the present invention relates the actual vibrator output with the measured vibrator motion or motions-. The vibrators are energized with a predetermined pattern. This pattern is used along with the measured motion or motions of the source to separate the received data according to the source used to generate the detector motion. A ratio is determined by dividing the vibratory seismic data by the measured motion or motions of each of the vibrators to remove the unknown applied force leaving the earth reflectivity times a time derivative, divided by a minimum phase function. Minimum phase deconvolution is performed to remove the time derivative divided by the transfer function of minimum phase. The method may also include the steps of shot ensemble deconvolution, receiver ensemble deconvolution, statics correction, F-K filtering for noise, receiver deconvolution, zero phase spiking deconvolution and model dephasing.

BRIEF DESCRIPTION OF THE DRAWINGS

FIG. 3 is a block diagram of a flow chart illustrating a preprocessing method for data generated by multiple vibratory sources.

DESCRIPTION OF THE PREFERRED EMBODIMENT

In gathering seismic data using ground vibrations, a simple vibrator may be used in the present invention. As in the prior art, a large mass is placed in contact with the ground. A force is applied by reversing hydraulic flow in a chamber in a reaction mass that is suspended by a piston and rod assembly that is attached to a stilt structure at a cross member. In the present invention, the reaction mass motion is measured by a pair of accelerometers mounted on the reaction mass itself. The motion of a baseplate, which is actually coupled to the ground, is measured by an additional pair of accelerometers mounted on the stilt structure cross member.

In the present invention, a signal directly related to the actual signal that the vibrator is sending into the ground is used in pre-processing. The vibrator motion or motions are measured to provide a signal that is used to process the data. Thus, the data is not correlated with a theoretical sweep signal but the data is divided by a minimum phase relative of the actual transmitted signal in the frequency domain, which removes the actual transmitted signal from the determination. When solving for the earth reflectivity, data is basically divided by the vibrator ground force multiplied by a transfer function of minimum phase, removing the vibrator force from the data. This leaves the earth reflectivity multiplied by a time derivative divided by a minimum phase transfer function, which ratio is then removed by minimum phase deconvolution.

Figure 1:
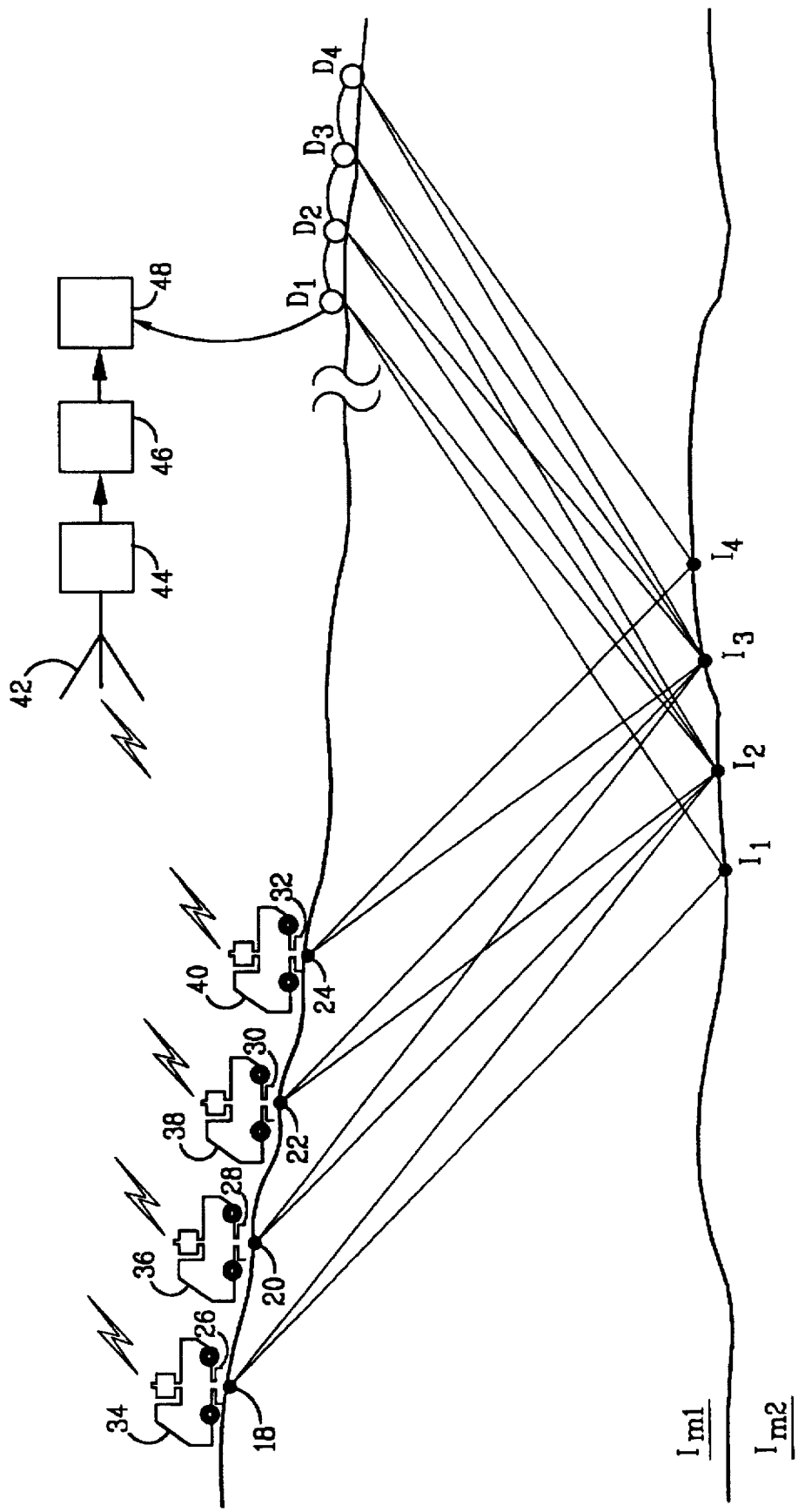
FIG. 1 is a drawing illustrating a typical seismic data gathering procedure.

FIG. 1 is a system diagram illustrating the data gathering process of the present invention. Vibrators 18, 20, 22 and 24 with two pairs of accelerometers 26, 28, 30 and 32, as described above, that measure the actual signal that is generated into the earth are located on trucks 34, 36, 38 and 40, respectively. The signals are then transmitted via radio link 42 to master vibrator memory 44 where they are checked to determine their reliability and are stored for comparison at a later time.

The signals that are generated into the earth by vibrators 18, 20, 22 and 24 are reflected off the interface between subsurface impedance $Im_1$ and $Im_2$ at various points, $I_1$, $I_2$, . . . etc. along the interface- These reflected signals are detected by geophones $D_1$, $D_2$, $D_3$ and $D_4$, respectively. The signals generated by vibrators 18, 20, 22 and 24 on trucks 34, 36, 38 and 40 are transmitted to recorder 46 for transfer to tape 48 for combination with raw seismic data received from geophones $D_1$, $D_2$, $D_3$ and $D_4$. The received data signals and the raw seismic data stored on a tape 48 can be transferred to computers at other locations.

The measured signals are representative of the actual signals that are generated into the surface of the earth through vibratory source technique. These measured signals are minimum phase relatives of the actual signals that are generated into the earth by this technique. In prior art applications, most processing is done with the reference sweep signal which is the signal intended to be generated into the surface of the earth. In the present invention, a signal which is minimum phase related to the actual force generated into the earth is measured and taken from the vibrator source directly. Thus, a relative of the actual signal is used in the process instead of a theoretical signal.

Using the method of the present invention, High Fidelity Vibratory Seismic, HFVS, recording vibratory motion and processing the recorded seismic data is done in such a way that the unknown actual applied force does not need to be known. An important factor is that the measured quantity is directly proportional to the actual force applied. In this manner, the actual force can be eliminated by division.

In conventional processing a reference signal x is fed to an actuator which puts a signal, the true vibrator output, into the ground. As this signal, the true vibrator output travels through the earth, it is multiplied by the impulse response of the earth in the frequency domain or convolved with the impulse response in the time domain. It is this convolution product, the time derivative of the actual signal convolved with the impulse response of the earth that is correlated with the reference sweep signal. This process is correct if and only if the reference sweep signal is equal to the true vibrator output.

The present invention takes a different approach than conventional processing. In a first aspect of the different approach, the present invention recognizes that the motions measured on the vibrator are merely related to the actual output force or signal that is put into the ground. The measured signal is related to the actual ground by a minimum phase transfer function in the frequency domain. Although both the minimum phase transfer function and the actual output force are unknown, the minimum phase transfer function may be removed by minimum phase deconvolution. In a second aspect of the different approach, the present invention performs an inversion operation instead of the correlation process of conventional processing.

The detected seismic data is represented in the frequency domain by the product of the time derivative of the actual force with the reflectivity of the earth.

By using inverse filtering through a minimum phase band pass filter, the ratio of the measured seismic motion to the measured motion of the vibrator can be computed. This ratio eliminates the unknown actual output force. A scaling factor is also required to preserve total energy through the inverse filtering process.

The resulting seismogram is represented by the ratio of the measured seismic motion to the measured motion of the vibrator and is the desired answer, the earth reflectivity, convolved with a minimum phase function. It is a property of minimum phase functions that their derivative and their reciprocal are also minimum phase. Thus the seismogram can be further processed with minimum phase deconvolution to obtain the impulse response of the earth in the frequency domain. In essence, the ratio of the measured seismic motion to the measured motion of the vibrator seismogram is the band limited impulse seismogram. It is causal and minimum phase related to the earth response.

This method is always correct since the actual and unknown vibratory motion has been eliminated.

Figure 2:
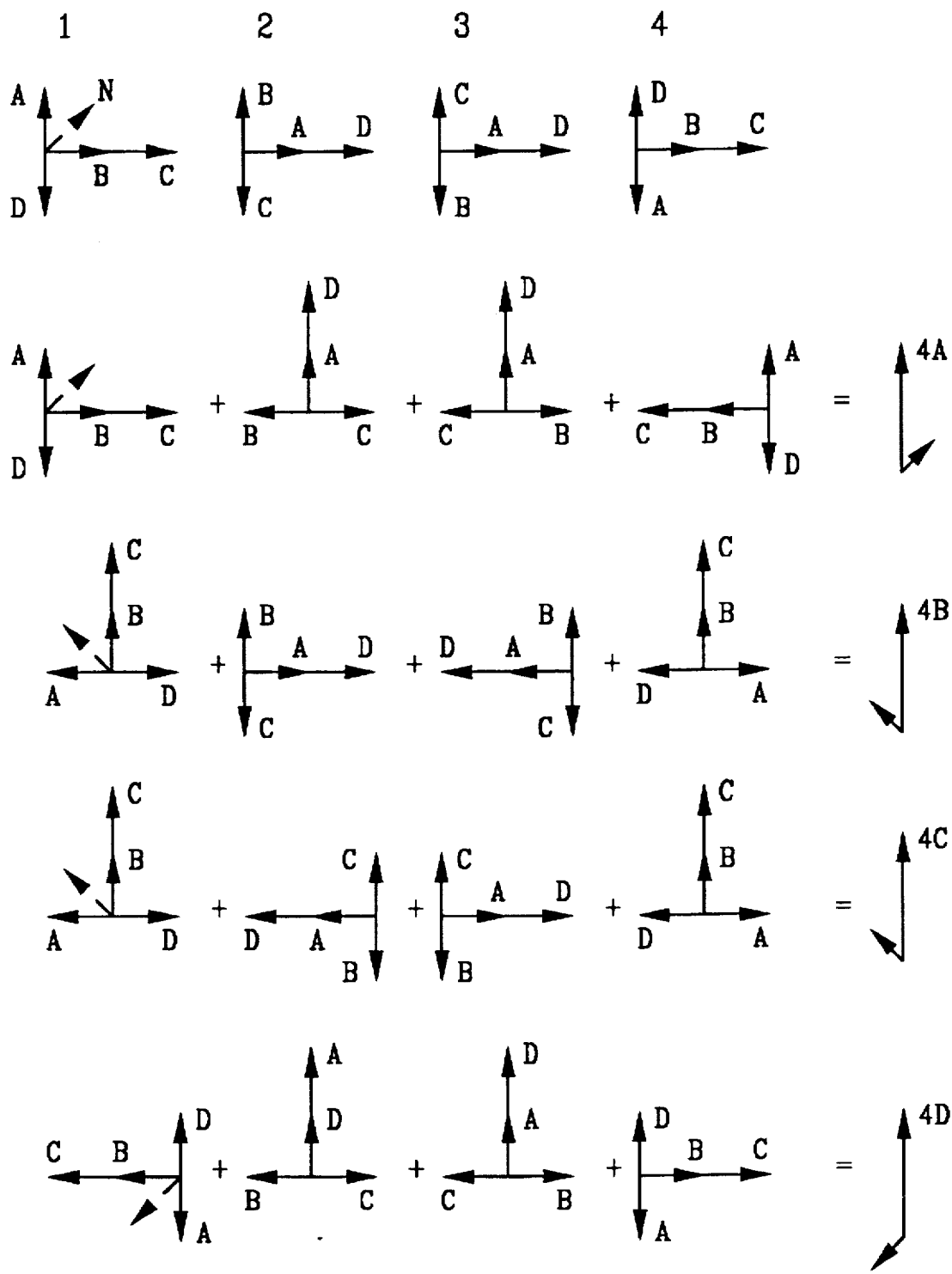
FIG. 2 is a vector representation of the phase sequence employed to separate simultaneously acquired sweeps.

FIG. 2 illustrates a phase sequence employed to separate the simultaneously acquired sweeps. The method of solution illustrated does not cross couple the vibrators by making A cancel B for instance but it does require that A done at 0 degrees plus another A done at 180 degrees must add to Zero in the solution for B. The phase feedback loop and the amplitude control were not capable of guaranteeing the latter condition. Of more difficulty is to cause a sweep done at 0 degrees to cancel when added to one done at 90 degrees and with 90 degrees of phase added.

Two other methods of simultaneous separation as follows:

| METHOD 1 | | | | |
|---|---|---|---|---|
| SWEEP # | 1 | 2 | 3 | 4 |
| VIBRATOR A (phase) | 0 | 0 | 0 | 0 |
| VIBRATOR B (phase) | 0 | 180 | 0 | 180 |
| VIBRATOR C (phase) | 0 | 0 | 180 | 180 |
| VIBRATOR D (phase) | 0 | 180 | 180 | 0 |

This method avoids the 90 degree problem and only requires that a sweep done at 0 degrees be the mirror image of one done at 180 degrees. If simultaneous technology is to be used, the field system must test in real time the condition necessary for effective separation. For example, a system should guarantee that Vibrator A's motions are repeatable in real time.

| METHOD 2 | | | | |
|---|---|---|---|---|
| SWEEP # | 1 | 2 | 3 | 4 |
| VIBRATOR A | OFF | 0 | 0 | 0 |
| VIBRATOR B | 0 | OFF | 0 | 0 |
| VIBRATOR C | 0 | 0 | OFF | 0 |
| VIBRATOR D | 0 | 0 | 0 | OFF |

As in the first method, confirmation of the separation assumption needs to be made in real-time. This method produces slightly less signal, three instead of four, but uses the least demanding requirement for separation, namely that the sweeps repeat.

For both of these methods the necessary processing signals can be encoded in a similar fashion and the individual vibrator motions can be extracted. This means that only one signal needs to be telemetered to the recorder for each sweep sequence.

Referring now to FIG. 3 a flow chart of the method of present invention is illustrated in block form. This method may be performed on any digital computer or work station currently in use in the art.

Initially, at block 50 data stored on tape 48 is received. Data received may be of any type of seismic data generated using vibratory source techniques.

At block 52 the received data is separated. This process begins when the seismic energy responsible for the data is first generated. There are several methods for generating seismic data to permit separation of the detected data which have been discussed previously. Any of the previous methods along with any methods currently in use in the art may be used to separate the received data, however, the preferred embodiment with the phase separation previously described.

At block 54, the inversion process is performed on the received data with the measured signals. This represents a significant difference between the present invention and conventional processing. In conventional processing, the received data is convolved with signals that are assumed to be generated into the earth's surface. In the present invention, an inversion process is used which eliminates certain assumptions which have been described previously.

At block 56 a model trace is generated. This model trace is basically a trace with a spike to record the phase and amplitude of the original data and will be used later to remove phase errors introduced in the pre-processing method of the present invention.

At block 58 the results of block 54, the results of the inversion process, undergoes shot deconvolution. A Wiener-Levinson spiking deconvolution is used in the present invention, however, any deconvolution which uses a common shot gather format to remove the effects due to variations between individual shots may be used.

At block 60, source statics correction is performed on the data. In the preferred embodiment, the same gather for statics correction and for FK filtering is used, a constant receiver location gather to remove source statics.

At block 62 FK filtering is performed using a constant receiver location variable shot gather to remove ground roll. At block 64 receiver deconvolution is performed on the data, which is also, preferably, a Wiener-Levinson spiking ensemble deconvolution. This is a common receiver gather to remove receiver noise, however, any deconvolution that is directed to the removal of receiver noise is acceptable. At block 66 the data undergoes zero phase spiking deconvolution. This is a spectral whitening deconvolution to remove monochromatic noise.

At block 68 model dephasing is done. In this deconvolution the model trace which was generated at block 56 to record the original phase and amplitude is used to remove any phase errors introduced by the previous processing steps. At this point, the method of the present invention has completed the pre-processing and conventional processing may commence after block 68.

The method of the present invention for recording and pre-processing high resolution vibratory source data has been described which includes the steps of division with measured signals, receiver and shot ensemble deconvolution, statics correction, F-K filtering for noise, zero phase spiking deconvolution and model dephasing. As stated previously, an actual vibrator signal related to what the vibrator is sending into the ground is used in pre-processing. The vibrator motion is measured to provide a signal that is used to process the data. The data is divided by the actual transmitted signal in the frequency domain.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

I claim:

1. A method for recording high resolution vibroseis data comprising the steps of:

receiving electrical signals representing received seismic information generated by multiple vibrators;

receiving measured signals representing transmitted seismic waves from each of said multiple vibrators;

separating said electrical signals corresponding to each of said multiple vibrators;

performing an inversion function on said separated electrical signals with said corresponding measured signals to obtain inversion electrical signals; and performing minimum phase deconvolution on said inversion electrical signals.

2. The method according to claim 1 also including the steps of:

generating a model trace with a spike of said inverted electrical signals;

shot deconvolving said inversion electrical signals;

performing statics correction on said deconvolved inversion electrical signals;

filtering said statics corrected electrical signals;

performing receiver deconvolution on said filtered electrical signals;

performing zero phase spiking deconvolution on said receiver deconvolved signals;

dephasing said zero phase deconvolved signals with said model trace.

3. The method according to claim 1 wherein said separating step includes the step of:

varying the generation sequence of each of said multiple vibrators.

4. The method according to claim 1, wherein said receiving measured signals step includes the steps of:

measuring the seismic signal actually transmitted into the earth's surface; and converting said measured seismic signals into a measured electrical signal.

5. The method according to claim wherein said separating step includes the step of:

varying the generation sequence of each of said multiple vibrators.

6. An apparatus for recording high resolution vibroseis data comprising:

means for receiving electrical signals representing received seismic information from multiple vibrators and measured signals representing transmitted seismic waves from each of said multiple vibrators;

separating means for separating said electrical signals according to Said measured signals;

means for performing an inversion function on said separated electrical signals with said corresponding measured signals to obtain inversion electrical signals; and means for minimum phase deconvolving said inversion electrical signals.

7. The apparatus according to claim 6 also including:

correction means for performing statics correction on said deconvolved inversion electrical signals;

filtering means for said statics corrected electrical signals;

summing means for said filtered statics corrected electrical signals;

recording means for said summed electrical signals; and display means for displaying said recorded summed signals.

8. The apparatus according to claim 6 wherein said separating means includes:

means for varying the generation sequence of each of said multiple vibrators.

9. The apparatus according to claim 6 wherein said means for receiving measured signals includes:

means for measuring the seismic signal actually transmitted into the earth's surface; and means for converting said measured seismic signals into a measured electrical signal.

10. The apparatus according to claim 9 wherein said means for separating includes:

means for varying the generation sequence of each of said multiple vibrators.

11. A method for recording and pre-processing high fidelity vibratory seismic data signals generated by a plurality of vibratory seismic sources comprising the steps of:

measuring the motion of each of the vibratory sources which is related to the vibrator applied force times a transfer function of minimum phase, causal, linear system;

relating actual vibrator output with said measured vibrator motion;

separating of the vibratory seismic data signals according to generating source;

determining a ratio by dividing the separated vibratory seismic data signals by said measured motion of each corresponding vibratory source to remove the unknown applied force leaving the earth reflectivity times a time derivative divided by a minimum phase function;

minimum phase band pass filtering said resulting ratio; and performing minimum phase deconvolution on said minimum phase band pass filtered ratio to remove the time derivative divided by the transfer function of minimum phase function.

12. The method according to claim 10 also including the steps of:

performing shot ensemble deconvolution on said minimum phase band pass filtered ratio.

13. The method according to claim 10 also including the steps of:

performing receiver ensemble deconvolution on said minimum phase band pass filtered ratio.

14. The method according to claim 10 also including the steps of:

performing statics correction on said minimum phase band pass filtered ratio.

15. The method according to claim 10 also including the steps of:

performing F-K filtering for noise on said minimum phase band pass filtered ratio.

16. The method according to claim 10 also including the steps of:

performing zero phase spiking deconvolution on said minimum phase band pass filtered ratio.

17. The method according to claim 10 also including the steps of:

generating a model trace from said vibratory seismic data signals generated by a plurality of vibratory seismic sources; and performing model dephasing using said model trace on said minimum phase band pass filtered ratio.

* * * * *